United States Patent [19]
Kaji

[11] Patent Number: 6,064,166
[45] Date of Patent: May 16, 2000

[54] POWER STEERING APPARATUS

[75] Inventor: Hiroaki Kaji, Yamatokooriyama, Japan

[73] Assignee: Koyo Seiko Co., Ltd., Osaka, Japan

[21] Appl. No.: 09/350,985

[22] Filed: Jul. 12, 1999

[30] Foreign Application Priority Data

Jul. 13, 1998 [JP] Japan .................................. 10-197614

[51] Int. Cl.$^7$ ................................................ B62D 5/065
[52] U.S. Cl. ......................... 318/489; 180/422; 180/423; 318/272
[58] Field of Search .................................. 318/648, 652, 318/268, 272, 432, 433, 456, 489, 549, 550; 180/417, 421, 422, 423, 428

[56] References Cited

U.S. PATENT DOCUMENTS

| | | |
|---|---|---|
| 4,392,540 | 7/1983 | Michio et al. . |
| 4,499,964 | 2/1985 | Abe et al. . |
| 4,518,055 | 5/1985 | Yagi et al. . |
| 4,552,240 | 11/1985 | Takeshima et al. . |
| 5,711,394 | 1/1998 | Fujii et al. ............................. 180/422 |
| 5,761,627 | 6/1998 | Seidel et al. ........................ 180/442 X |

FOREIGN PATENT DOCUMENTS

| | | |
|---|---|---|
| 59-118577 | 7/1984 | Japan . |
| 5-69844 | 3/1993 | Japan . |

*Primary Examiner*—Bentsu Ro
*Attorney, Agent, or Firm*—Rabin & Champagne, P.C.

[57] ABSTRACT

A power steering apparatus is provided, which is adapted to generate a steering assist force by a hydraulic pressure of a pump driven by an electric motor. The apparatus includes: a vehicle speed sensor for sensing a vehicle speed; and a control circuit for switching a control mode between an assist mode in which a first voltage V1 is applied to the electric motor and a standby mode in which no voltage or a second voltage V2 lower than the first voltage V1 is applied to the electric motor. The control circuit includes a threshold computation circuit for determining a threshold of a predetermined physical quantity (motor current or steering angle) as a function of the vehicle speed V sensed by the vehicle sensor, and comparison means for comparing a level of the physical quantity with the threshold determined by the threshold computation circuit. The control mode is switched from the assist mode to the standby mode on the basis of a comparison result obtained by the comparison means.

10 Claims, 6 Drawing Sheets

POWER STEERING APPARATUS

BACKGROUND OF THE INVENTION

1. Field of the Invention

The present invention relates to a power steering apparatus which applies a steering assist force to a steering mechanism by a hydraulic pressure generated by a pump driven by an electric motor.

2. Description of Related Art

Power steering apparatuses are conventionally utilized which assist operation of a steering wheel by supplying a working oil from an oil pump to a power cylinder coupled to a steering mechanism. The oil pump is driven by an electric motor, and a steering assist force is generated by the power cylinder in accordance with the rotation speed of the electric motor. The steering assist force is not required when the steering wheel is not turned. Therefore, the electric motor is off in a straight travel steering state (steering inactive state) where the steering wheel is virtually at a steering angle midpoint and, in response to detection of a change in any of steering-related conditions, the electric motor is actuated.

For power saving and smooth rise of a hydraulic pressure, a standby driving operation is performed to drive the electric motor at a low voltage in the steering inactive state.

In the electric motor control described above, it is necessary to detect a time point at which a transition from a steering active state to the steering inactive state occurs.

Japanese Unexamined Patent Publication No. 5-69844 (1993), for example, discloses a motor control method in view of the fact that an electric current flowing through the electric motor varies in accordance with a steering torque. In this method, the motor current is sensed and, when the absolute value of the sensed electric current or the change amount of the sensed electric current relative to a non-load electric current is reduced to lower than a threshold, the electric motor is stopped or driven at the minimum rotation speed.

However, a curve plotted between the motor current and the steering angular position is generally shifted in dependence on a vehicle speed as shown in FIG. 6. Therefore, a steering angular position at which a transition to a motor off state or a standby state occurs varies depending on the vehicle speed, if the judgment for the detection of the transition timing is based on a predetermined electric current threshold $\Delta I$. This results in variations in steering operation feeling.

SUMMARY OF THE INVENTION

It is an object of the present invention to provide a power steering apparatus which ensures a consistent steering operation feeling irrespective of a vehicle speed.

The power steering apparatus according to the present invention comprises: an electric motor; a pump to be driven by the electric motor for generating a hydraulic pressure for steering assist; a vehicle speed sensor for sensing a vehicle speed; and control means for switching a control mode between a first mode in which a first voltage V1 is applied to the electric motor and a second mode in which no voltage or a second voltage V2 lower than the first voltage V1 is applied to the electric motor. The control means includes threshold computation means for determining a threshold of a predetermined physical quantity (representing steering operation) as a function of the vehicle speed V sensed by the vehicle sensor, and comparison means for comparing a value of the physical quantity with the threshold determined by the threshold computation means, and is adapted to switch the control mode from the first mode to the second mode on the basis of a comparison result obtained by the comparison means.

The predetermined physical quantity may be an electric current I flowing through the electric motor. In this case, the threshold computation means preferably includes electric current threshold computation means for determining an electric current threshold $\Delta I$ as a function of the vehicle speed V sensed by the vehicle sensor. The comparison means is preferably adapted to judge whether or not an electric current I sensed by an electric current sensor is lower than the electric current threshold $\Delta I$ determined by the electric current threshold computation means or whether or not the electric current I is within a range between a non-load electric current value $I_O$ and a value obtained by adding the electric current threshold $\Delta I$ to the non-load electric current value $I_O$.

In this case, the control means is preferably adapted to switch the control mode from the first mode to the second mode on the basis of a necessary condition that the electric current I sensed by the electric current sensor is lower than the electric current threshold $\Delta I$ or the electric current I is within the range between the non-load electric current value $I_O$ and the level obtained by adding the electric current threshold $\Delta I$ to the non-load electric current value $I_o$.

The electric current threshold computation means may be comprised of a memory which stores therein values of the electric current threshold $\Delta I$ derived from the function of the vehicle speed.

The predetermined physical quantity may be a steering angle $\theta$. In this case, the threshold computation means preferably includes steering angle threshold computation means for determining a steering angle threshold $\Delta\theta$ as a function of the vehicle speed V sensed by the vehicle speed sensor. The comparison means preferably includes means for judging whether or not the steering angle $\theta$ is within a range defined between left and right threshold values $\pm\Delta\theta$ with respect to a steering angle midpoint. The control means is preferably adapted to switch the control mode from the first mode to the second mode on the basis of a necessary condition that the steering angle $\theta$ is within the range defined between the left and right threshold values $\pm\Delta\theta$ with respect to the steering angle midpoint.

The steering angle threshold computation means may be comprised of a memory which stores therein values of the steering angle threshold $\Delta\theta$ derived from the function of the vehicle speed.

It is preferred that the power steering apparatus further comprises means for determining a time-based change rate $d\theta/dt$ of the steering angle and the control means is adapted to switch the control mode from the first mode to the second mode on condition that the steering angle change rate $d\theta/dt$ is not higher than a predetermined level.

The control means may be adapted to switch the control mode from the first mode to the second mode if the necessary conditions are kept satisfied for a predetermined period.

In accordance with one embodiment of the present invention, the power steering apparatus comprises control means which is capable of switching a control mode between a first mode (assist mode) in which a first voltage V1 is applied to the electric motor when a steering operation is performed and a second mode (stop mode or standby mode) in which no voltage or a second voltage V2 lower than the first voltage is applied to the electric motor when the steering operation is not performed. The control means includes means for judging (a) if the steering angle change rate dθ/dt is not higher than the predetermined level in the first mode and (b) if the electric current I sensed by the electric current sensor is within the range between the non-load electric current value $I_0$ and the value obtained by adding the electric current threshold ΔI to the non-load electric current value $I_0$ or is not higher than the electric current threshold ΔI in the first mode, and means for determining the electric current threshold ΔI as a variable which varies in accordance with the vehicle speed, and the control means is adapted to switch the control mode from the first mode to the second mode if both of the conditions (a) and (b) are satisfied.

In the power steering apparatus of the aforesaid construction, it is judged whether or not the electric current I sensed by the electric current sensor satisfies the following expression:

$$I_0 < I < I_0 + \Delta I$$

or $$0 \leq I < \Delta I$$

on the precondition that the steering operation is performed (steering angle change rate dθ/dt ≦ predetermined level) and, if the judgment is positive, the control mode is switched from the assist mode to the stop mode or the standby mode. Here, $I_0$ represents the non-load electric current value, which is zero in the stop mode and depends on the temperature of a working oil and the like in the standby mode. In this case, the electric current threshold ΔI is determined as the variable which varies in accordance with the vehicle speed and, therefore, depends on the vehicle speed.

FIG. 1 is a graph showing a relationship between the electric current threshold ΔI and the vehicle speed. As shown, the lower the vehicle speed, the smaller the electric current threshold ΔI. The higher the vehicle speed, the greater the electric current threshold ΔI. Referring to a graph of FIG. 6 in conjunction with FIG. 1, angular positions of the steering wheel at which the control mode is switched from the assist mode to the stop mode or the standby mode approximate to a certain angular position. Therefore, the steering operation feeling can be kept consistent irrespective of the vehicle speed.

In the power steering apparatus of the present invention, the motor current threshold at which the control mode is switched from the assist mode to the stop mode or the standby mode can be selected in accordance with the vehicle speed and, therefore, the steering angular position of the steering wheel at which the control mode is switched from the assist mode to the stop mode or the standby mode can be set virtually constant irrespective of the vehicle speed. Hence, the steering operation feeling can be kept consistent irrespective of the vehicle speed.

In accordance with another embodiment of the present invention, the control means of the power steering apparatus includes means for judging (a) if the steering angle change rate dθ/dt is not higher than the predetermined level in the first mode, (b) if the electric current I sensed by the electric current sensor is within the range between the non-load electric current value $I_0$ and the value obtained by adding the electric current threshold ΔI to the non-load electric current value $I_0$ or is not higher than the electric current threshold $I_0$ in the first mode, and (c) if the steering angle θ is within the range defined between the left and right threshold values ±Δθ with respect to the steering angle midpoint, and means for computing the steering angle threshold Δθ as a variable which varies in accordance with the vehicle speed, and the control means is adapted to switch the control mode from the first mode to the second mode if all the conditions (a), (b) and (c) are satisfied.

In the power steering apparatus of the aforesaid construction, it is judged whether or not the electric current I sensed by the electric current sensor satisfies the following expression:

$$I_0 \leq I \leq I_0 + \Delta I \text{ or } 0 \leq I \leq \Delta I \qquad (1)$$

and whether or not the steering angle θ is within the range defined between the left and right threshold values ±θ with respect to the steering angle midpoint, i.e., the steering angle θ satisfies the following expression:

$$\theta 0 - \Delta \theta < \theta < \theta 0 + \Delta \theta \qquad (2)$$

(wherein θ0 represents the steering angle midpoint) and, if all the judgment results are positive, the control mode is switched from the assist mode to the stop mode or the standby mode.

FIGS. 2A and 2B are graphs showing the judgment conditions, wherein a range specified by the expression (1) is defined between horizontal lines A—A, and a range specified by the expression (2) is defined between vertical lines B—B.

In the present invention, the steering angle threshold Δθ is determined as the variable which varies in accordance with the vehicle speed and, hence, the range defined between the vertical lines B—B is variable in accordance with the vehicle speed.

FIG. 3 is a graph showing a relationship between the steering angle threshold Δθ and the vehicle speed. The lower the vehicle speed, the higher the steering angle threshold Δθ. When the vehicle speed becomes lower than a certain level, the steering angle threshold Δθ is steeply increased. With the steep increase in the steering angle threshold Δθ, the expression (2) is satisfied irrespective of the steering angular position. Therefore, the expression (2) has virtually no function as a conditional expression in this case. On the other hand, the steering angle threshold Δθ gradually decreases as the vehicle speed increases. Therefore, the steering angle range in which the control mode is switched to the stop mode or the standby mode is narrowed as the vehicle speed increases.

By thus defining the relationship between the steering angle threshold Δθ and the vehicle speed, the control mode can be switched from the assist mode to the stop mode or the standby mode irrespective of the steering angular position if the steering operation is not performed when the vehicle is at a stop. Further, where the steering angle is close to the steering angle midpoint when the vehicle is traveling at a speed higher than a certain level, it is considered that the vehicle is in a straight traveling state, i.e., the steering operation is not performed.

In the power steering apparatus of the present invention, the threshold for the angular position of the steering wheel at which the control mode is switched from the assist mode to the stop mode or the standby mode can be selected in accordance with the vehicle speed and, therefore, the steering operation feeling can be kept consistent irrespective of the vehicle speed.

In accordance with further another embodiment of the present invention, the control means of the power steering apparatus further includes means for determining the electric current threshold ΔI as a variable which varies in accordance with the vehicle speed.

In the power steering apparatus, the steering angle threshold $\Delta\theta$ and the electric current threshold $\Delta I$ are respectively determined as the variables which vary in accordance with the vehicle speed. Therefore, the range defined between the lines A—A by the expression (1) and the range defined between the lines B—B by the expression (2) in FIGS. 2A and 2B respectively vary in accordance with the vehicle speed.

The control means preferably further includes timer means which is operative to switch the control mode from the first mode to the second mode if the switching conditions are kept satisfied for a predetermined period.

This arrangement prevents inadvertent control mode switching which may otherwise occur due to rough road traveling, for example. Therefore, the switching from the assist mode to the stop mode or the standby mode can stably be performed.

The foregoing and other objects, features and effects of the present invention will become more apparent from the following description of the preferred embodiments with reference to the attached drawings.

BRIEF DESCRIPTION OF THE DRAWINGS

FIG. 2A shows a case where $I_0<I<I_0+\Delta I$ and FIG. 2B shows a case where $\theta<I\leqq\Delta I$;

DESCRIPTION OF THE PREFERRED EMBODIMENTS

Figure 4:
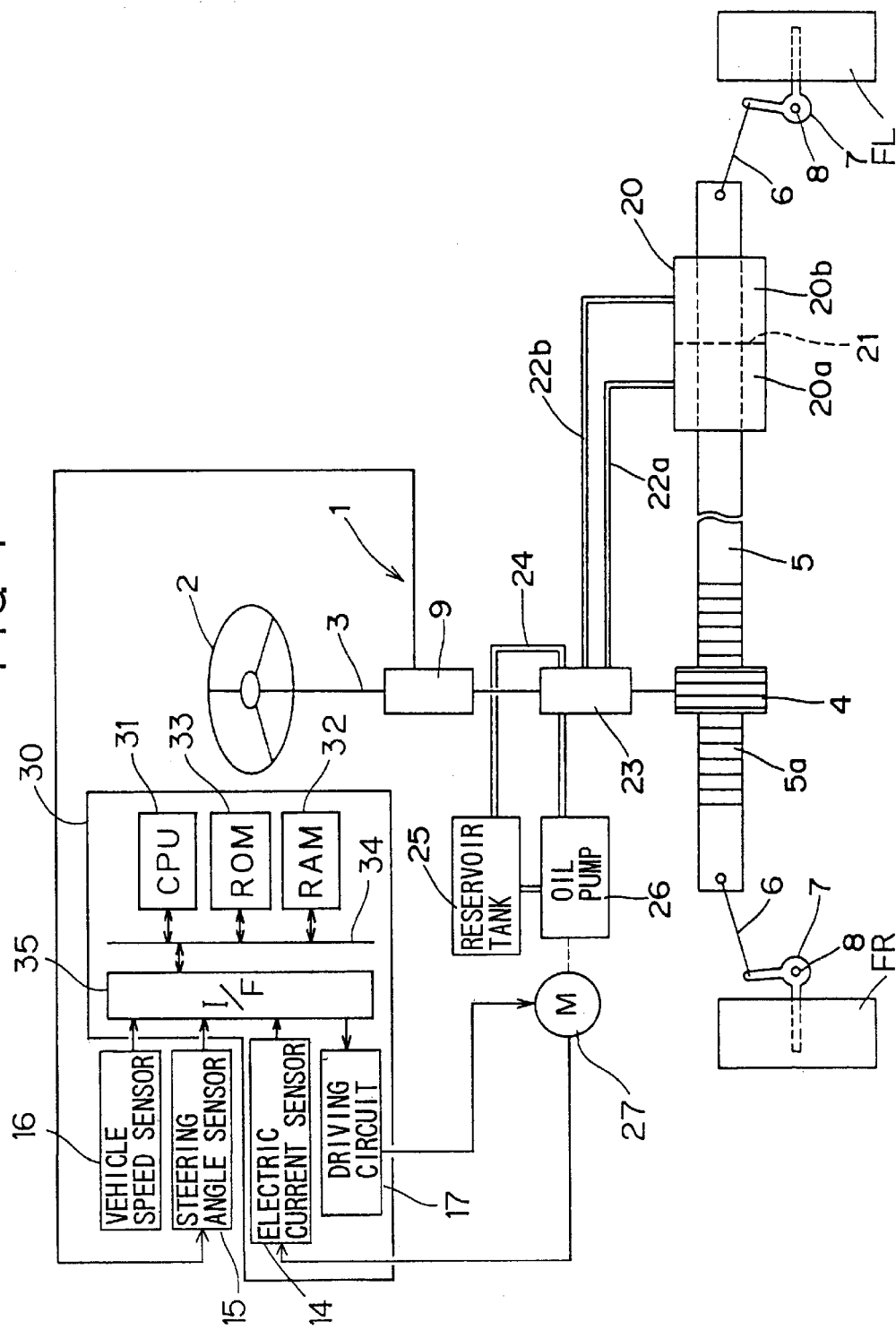
FIG. 4 is a block diagram illustrating the basic construction of a power steering apparatus.

FIG. 4 is a block diagram illustrating the basic construction of a power steering apparatus.

A steering mechanism 1 includes a steering wheel 2 to be operated by a driver, a steering shaft 3 coupled to the steering wheel 2, a pinion gear 4 provided at a distal end of the steering shaft 3, and a rack shaft 5 having a rack gear 5a meshed with the pinion gear 4 and extending transversely of a motor vehicle.

Tie rods 6 are connected to opposite ends of the rack shaft 5, and further connected to knuckle arms 7 which respectively support left and right front wheels FL and FR as steerable wheels. The knuckle arms 7 are respectively rotatable about king pins 8.

With this arrangement, when the steering wheel 2 is operated to rotate the steering shaft 3, the rotational motion is converted into a linear motion transverse to the motor vehicle by the pinion gear 4 and the rack shaft 5, thereby achieving the steering of the left and right front wheels FL, FR.

A torsion bar 9 which is adapted to be twisted in accordance with the direction and magnitude of a steering torque applied to the steering wheel 2 and a hydraulic pressure control valve 23 which is adapted to change its valve aperture in accordance with the direction and magnitude of the torsion of the torsion bar 9 are incorporated in the steering shaft 3. The hydraulic pressure control valve 23 is connected to a power cylinder 20 for applying a steering assist force to the steering mechanism 1. The power cylinder 20 includes a piston 21 provided integrally with the rack shaft 5, and a pair of cylinder chambers 20a and 20b split by the piston 21. The cylinder chambers 20a and 20b are connected to the hydraulic pressure control valve 23 via oil supply/return lines 22a and 22b, respectively.

The hydraulic pressure control valve 23 is disposed in an oil circulation line 24 which extends through a reservoir tank 25 and an oil pump 26. The oil pump 26 is driven by an electric motor 27, so that a working oil contained in the reservoir tank 25 is pumped up and supplied to the hydraulic pressure control valve 23. An excess of the working oil is returned to the reservoir tank 25 from the hydraulic pressure control valve 23 via the oil circulation line 24.

When a torsion is exerted on the torsion bar 9 in one direction, the hydraulic pressure control valve 23 supplies the working oil to one of the cylinder chambers 20a, 20b of the power cylinder 20 via one of the oil supply/return lines 22a, 22b. When a torsion is exerted on the torsion bar 9 in the other direction, the hydraulic pressure control valve supplies the working oil to the other of the cylinder chambers 20a, 20b of the power cylinder 20 via the other of the oil supply/return lines 22a, 22b. When virtually no torsion is exerted on the torsion bar 9, the hydraulic pressure control valve 23 is in a so-called equilibrium state, so that the working oil is not supplied to the power cylinder 20 but circulated in the oil circulation line 24.

When the working oil is supplied to either one of the cylinder chambers of the power cylinder 20, the piston 21 moves transversely of the motor vehicle. Thus, a steering assist force acts on the rack shaft 5 (power assist). For more detailed information about the operation of the hydraulic pressure control valve, see Japanese Unexamined Patent Publication No. 59-118577 (1984). The magnitude of the steering assist force can be adjusted by controlling a voltage to be applied to the electric motor 27 which drives the oil pump 26.

The rotation of the electric motor 27 is controlled by an electronic control unit 30. The electronic control unit 30 includes: a CPU 31; a RAM 32 which provides a work area for the CPU 31; a ROM 33 storing therein operation programs for the CPU 31, values of an electric current threshold $\Delta I$ as a function of a vehicle speed and values of a steering angle threshold $\Delta\theta$ as a function of the vehicle speed; buses 34 interconnecting these components; an input-output section 35; an electric current sensor 14 connected to the input-output section 35 for sensing an electric current flowing through the electric motor 27; and a driving circuit 17 for driving the electric motor 27.

The electronic control unit 30 is connected to the steering angle sensor 15 and the vehicle speed sensor 16.

A wheel speed sensor for sensing the rotation speed of a wheel, for example, is used as the vehicle speed sensor 16. If an ABS (anti-lock brake system) is mounted on the vehicle, a vehicle speed signal outputted from a vehicle speed sensor of the ABS unit may be applied to the electronic control unit 30.

The steering angle sensor 15 is provided in association with the steering wheel 2. The steering angle sensor 15 sets at an initial value "0" a steering angle of the steering wheel 2 observed when an ignition key switch is actuated for startup of an engine, and determines a relative steering angle with respect to the initial value.

In the present embodiment, a stop-and-go control is employed in which the electric motor 27 is not driven when the steering operation is not performed. However, the present invention is applicable to a case where a standby control is performed to drive the electric motor 27 at a low voltage, even when the steering operation is not performed, for elimination of an entrapped feeling in the steering operation and for smooth actuation of the electric motor 27.

The electronic control unit 30 applies a voltage V1 sufficient for the power assist to the electric motor 27 when the steering operation is performed, and stops the electric motor 27 on the basis of the following conditions.

Figure 5:
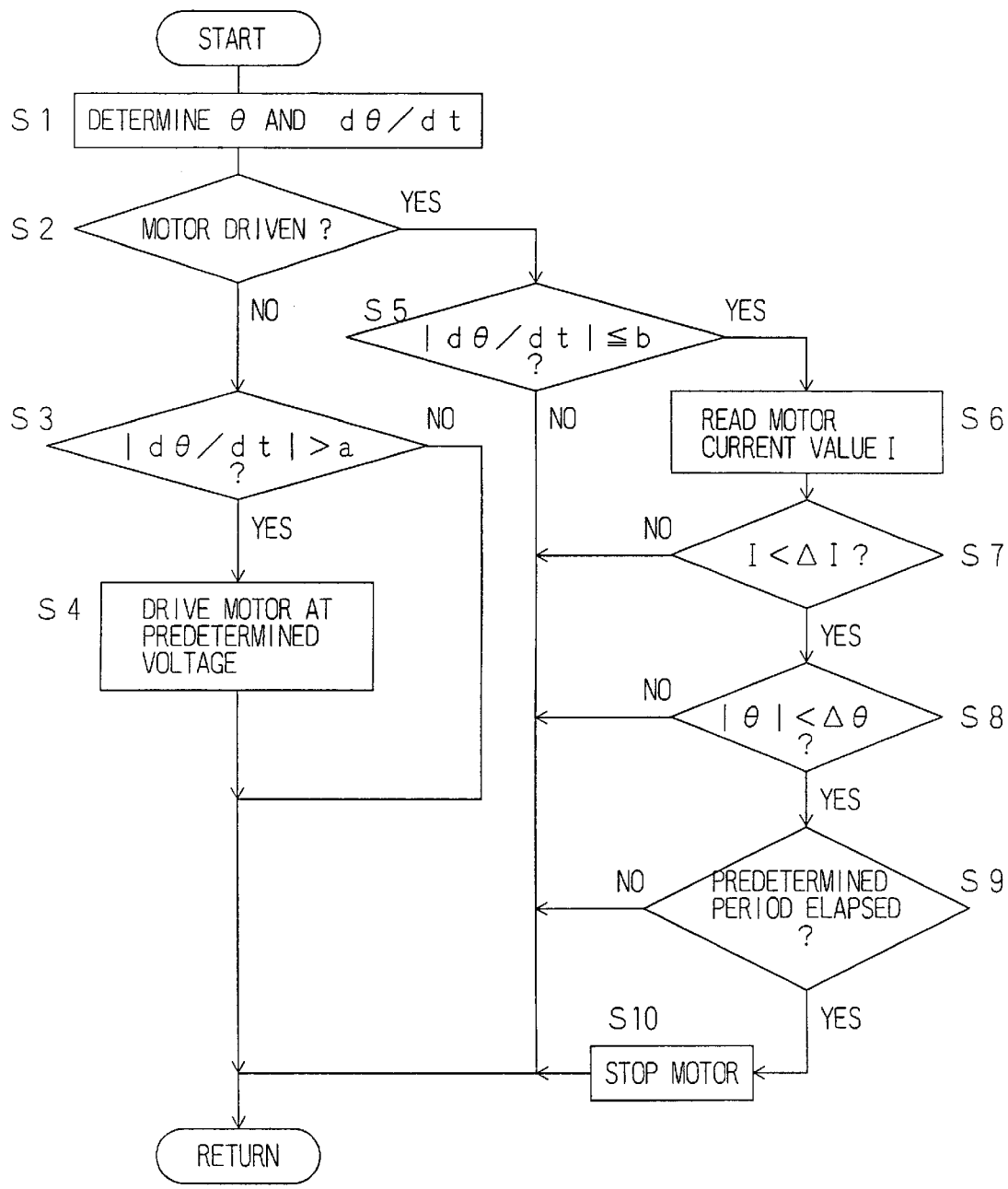
FIG. 5 is a flow chart for explaining conditions to be satisfied for switching a control mode from an assist mode to an electric motor stop mode.
Figure 6:
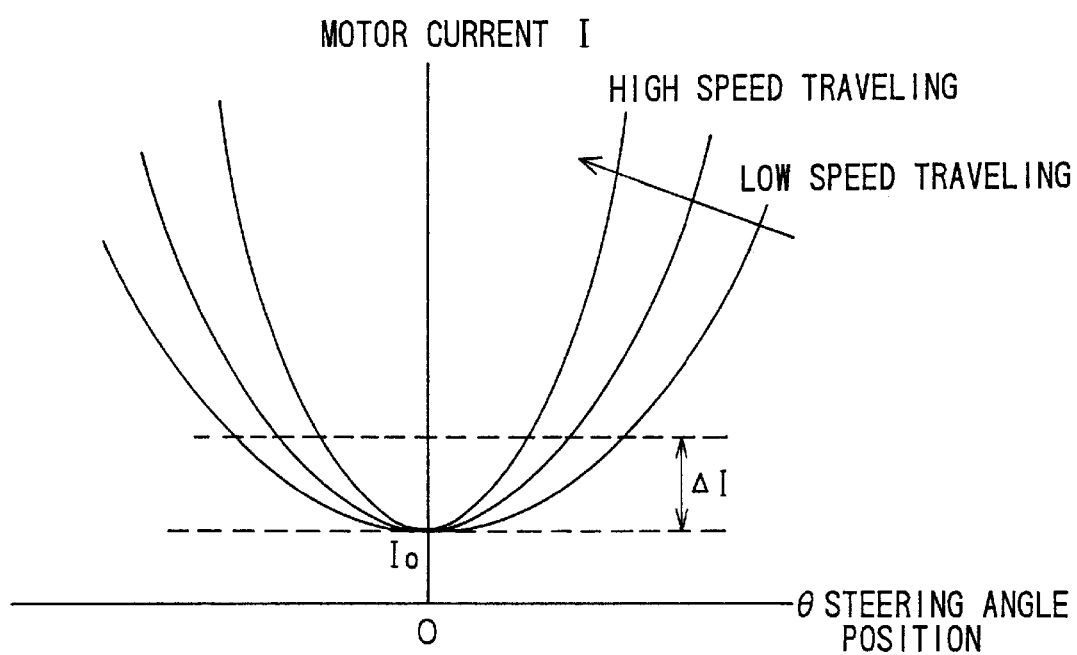
FIG. 6 is a graph showing curves plotted between a motor current and a steering angular position with the vehicle speed being employed as a parameter.

Referring to a flow chart of FIG. 5, an explanation will be given to the conditions to be satisfied for switching the control mode of the electric motor.

When the electronic control unit 30 is actuated in response to the turn-on of an ignition switch or the like, the CPU 31 determines a steering angle θ and the time-based change rate dθ/dt of the steering angle θ on the basis of steering angle data outputted from the steering angle sensor 15 (Step S1).

Then, it is judged whether or not the electric motor 27 is driven (Step S2). If the electric motor is not driven, it is judged, on the basis of the result of a comparison between the absolute value of the steering angle change rate dθ/dt and a threshold a (e.g., a=5 degrees/sec), whether or not the electric motor 27 is to be actuated (Steps S3, S4). The condition to be satisfied for the actuation of the electric motor 27 is not limited to the judgment based on the steering angle change rate, but any other known conditions may be employed.

If the electric motor 27 is driven, the CPU 31 judges whether or not the absolute value of the steering angle change rate dθ/dt is higher than a predetermined threshold b (Step S5). The threshold b is set to a value close to the threshold a, preferably b>a (e.g., b=8 degrees/sec). By defining the threshold b as b>a, the steering assist force can quickly be generated when the steering operation is started, and the application of the steering assist force can quickly be stopped when the steering operation ends.

If the absolute value of the steering angle change rate dθ/dt is not higher than the threshold b, the program goes to Step S6. The electric current value I is obtained from the output of the electric current sensor 14 (Step S6), and it is judged whether or not the obtained electric current value I is lower than the electric current threshold ΔI (Step S7).

$$I < \Delta I$$

Figure 1:
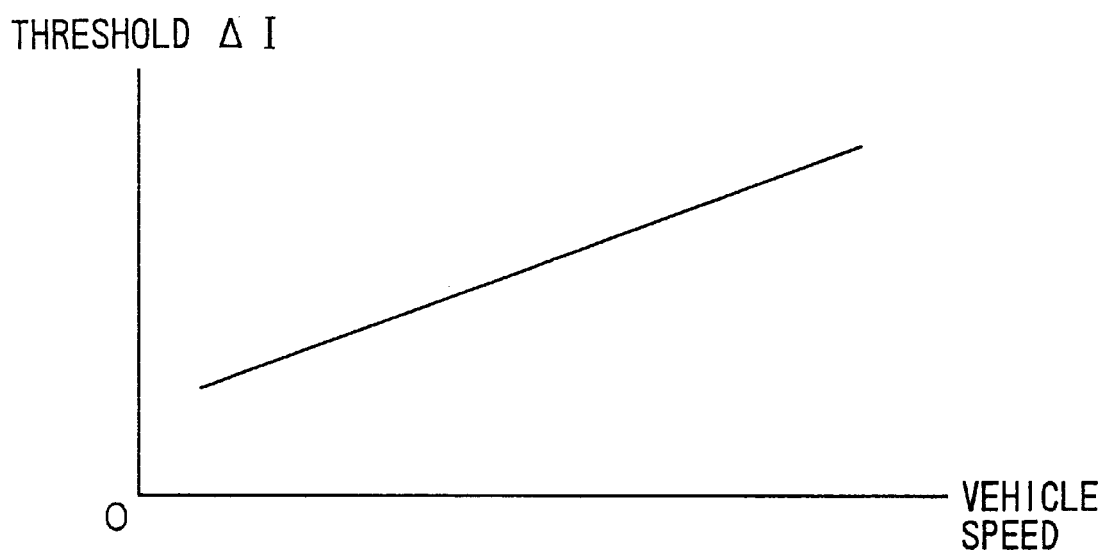
FIG. 1 is a graph showing a relationship of an electric current threshold $\Delta I$ versus a vehicle speed.
Figure 2A:
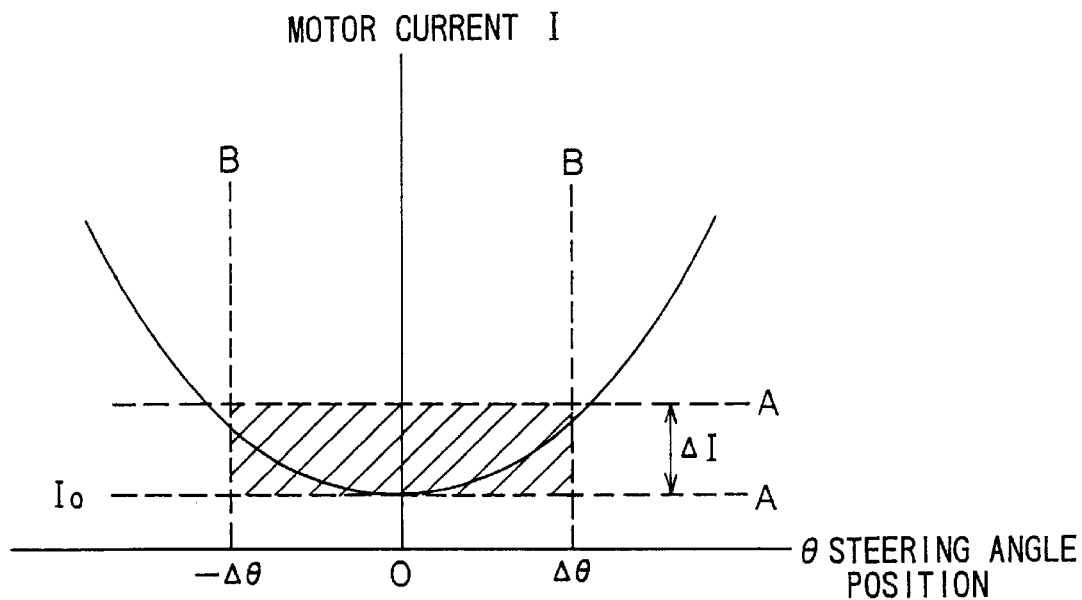
FIGS. 2A and 2B are graphs showing a range defined between left and right threshold values $\pm\Delta\theta$ of a steering angle $\theta$ and a range of the motor current threshold $\Delta I$, particularly.
Figure 2B:
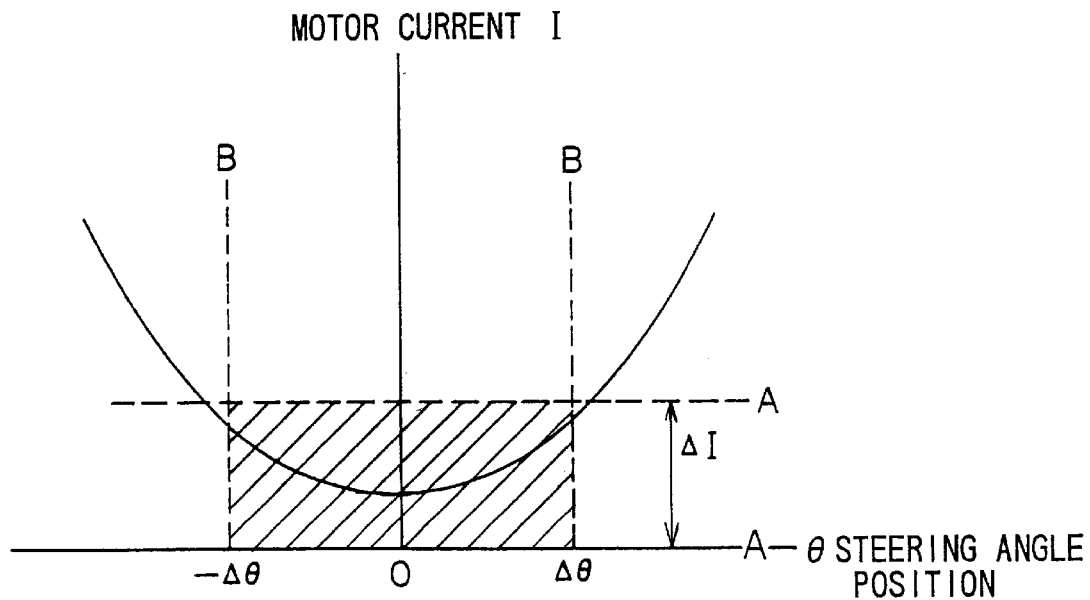

The electric current threshold ΔI defines the motor current range in which the steering assist is not required. The embodiment of the present invention is characterized in that the electric current threshold ΔI is represented as a function of the vehicle speed obtained from the output of the vehicle speed sensor 16, and a table of values derived from the function is stored in the ROM 33 (see FIG. 1).

Where the standby control is performed, the non-load electric current value $I_0$ is determined, and it is judged whether or not the electric current value I satisfies the following expression:

$$I_0 < I < I_0 + \Delta I$$

It is noted that the non-load electric current value $I_0$ varies depending on the temperature of the working oil and the like. Therefore, the most frequent electric current value or the minimum electric current value among sampled electric current values I, for example, may be employed as the non-load electric current value $I_0$.

If the electric current value I is lower than the electric current threshold ΔI (YES in Step S7), it is checked whether or not the absolute value of the steering angle θ is smaller than the steering angle threshold Δθ (Step S8). The steering angle threshold Δθ defines the steering angle range in which the steering assist is not required. The determination of the steering angle midpoint can be achieved by sampling steering angle data outputted from the steering angle sensor 15 and determining the most frequent steering angle. That is, the most frequent steering angle is defined as the steering angle midpoint.

Figure 3:
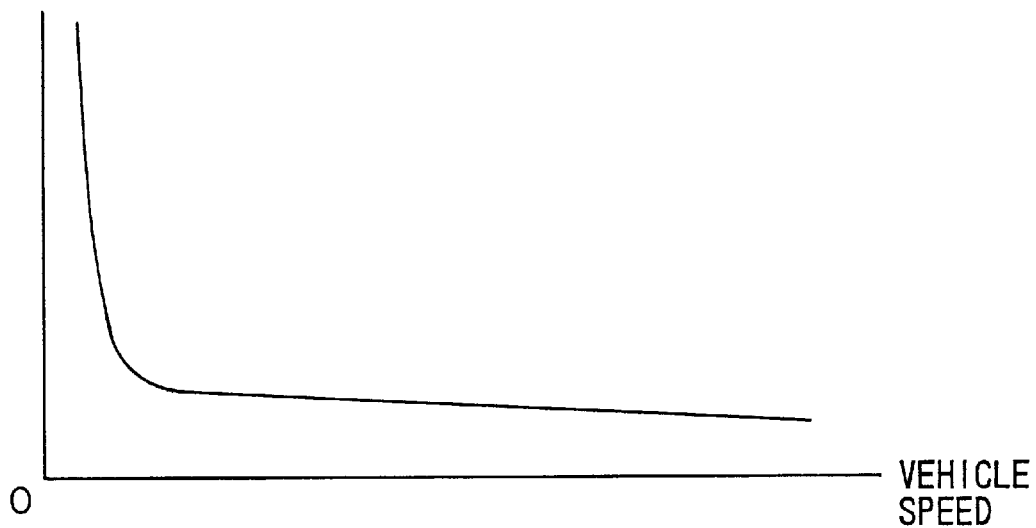
FIG. 3 is a graph showing a relationship of the steering angle threshold $\Delta\theta$ versus the vehicle speed.

In this embodiment, the steering angle threshold Δθ is represented as a function of the vehicle speed obtained from the output of the vehicle speed sensor 16, and a table of values derived from the function is stored in the ROM 33 (see FIG. 3).

If the absolute value of the steering angle θ is smaller than the steering angle threshold Δθ (YES in Step S8), it is judged whether or not the conditional expressions of Steps S5, S7, S8 are kept satisfied for a predetermined period (e.g., 1 to 3 seconds) (Step S9). If this judgment is positive, the CPU 31 stops the electric motor 27 (Step S10) because it is judged that the steering wheel 2 is not operated. If any of the judgments in Steps S5, S7, S8, S9 is negative, the program returns to Step S1.

In the above embodiment, the electric current threshold ΔI and the steering angle threshold Δθ are respectively stored as the functions of the vehicle speed in the ROM 33, but may be provided in any other forms. For example, at least one of the electric current threshold ΔI and the steering angle threshold Δθ may be stored as a function of the vehicle speed. Alternatively, the electric current threshold ΔI and the steering angle threshold Δθ may be calculated on the basis of the vehicle speed.

While the embodiment of the present invention has thus been described in detail, it should be understood that the embodiment is merely illustrative of the technical principles of the present invention but not limitative of the same. The spirit and scope of the present invention are to be limited only by the appended claims.

This application claims priority benefits under the Convention on the basis of Japanese Patent Application No. 10-197614 filed to the Japanese Patent Office on Jul. 13, 1998, the disclosure thereof being incorporated herein by reference.

What is claimed is:

1. A power steering apparatus, comprising:

an electric motor;

a pump to be driven by the electric motor for generating a hydraulic pressure for steering assist;

a vehicle speed sensor for sensing a vehicle speed; and a control circuit for switching a control mode between a first mode in which a first voltage V1 is applied to the electric motor and a second mode in which no voltage or a second voltage V2 lower than the first voltage V1 is applied to the electric motor;

wherein the control circuit includes a threshold computation circuit for determining a threshold of a predetermined physical quantity as a function of the vehicle speed V sensed by the vehicle sensor, and comparison means for comparing a value of the physical quantity with the threshold determined by the threshold computation circuit, the control circuit being operative to switch the control mode from the first mode to the second mode on the basis of a comparison result obtained by the comparison means.

2. A power steering apparatus as set forth in claim 1, further comprising:

an electric current sensor for sensing an electric current I flowing through the electric motor as the predetermined physical quantity;

wherein the threshold computation circuit includes an electric current threshold computation circuit for determining an electric current threshold $\Delta I$ as a function of the vehicle speed V sensed by the vehicle speed sensor;

wherein the comparison means judges whether or not the electric current I sensed by the electric current sensor is lower than the electric current threshold $\Delta I$ determined by the electric current threshold computation circuit or whether or not the electric current I is within a range between a non-load electric current value $I_0$ and a value obtained by adding the electric current threshold $\Delta I$ to the non-load electric current value $I_0$;

wherein the control circuit is operative to switch the control mode from the first mode to the second mode on the basis of a necessary condition that the electric current I sensed by the electric current sensor is lower than the electric current threshold $\Delta I$ or the electric current I is within the range between the non-load electric current value $I_0$ and the value obtained by adding the electric current threshold $\Delta I$ to the non-load electric current value $I_0$.

3. A power steering apparatus as set forth in claim 2, wherein the electric current threshold computation circuit includes a memory which stores therein values of the electric current threshold $\Delta I$ derived from the function of the vehicle speed.

4. A power steering apparatus as set forth in claim 2, further comprising:

a steering angle sensor for determining a steering angle θ as the predetermined physical quantity;

wherein the threshold computation circuit includes a steering angle threshold computation circuit for determining a steering angle threshold $\Delta\theta$ as a function of the vehicle speed V sensed by the vehicle speed sensor;

wherein the comparison means includes means for judging whether or not the steering angle θ sensed by the steering angle sensor is within a range defined between left and right threshold values $\pm\Delta\theta$ with respect to a steering angle midpoint;

wherein the control circuit is operative to switch the control mode from the first mode to the second mode on the basis of a necessary condition that the steering angle θ is within the range defined between the left and right threshold values $\pm\Delta\theta$ with respect to the steering angle midpoint.

5. A power steering apparatus as set forth in claim 4, wherein the steering angle threshold computation circuit includes a memory which stores therein values of the steering angle threshold $\Delta\theta$ derived from the function of the vehicle speed.

6. A power steering apparatus as set forth in claim 2, wherein the control circuit is operative to switch the control mode from the first mode to the second mode if the necessary condition is kept satisfied for a predetermined period of time.

7. A power steering apparatus as set forth in claim 1, further comprising:

means for determining a time-based change rate $d\theta/dt$ of the steering angle;

wherein the control circuit is operative to switch the control mode from the first mode to the second mode on the basis of a necessary condition that the steering angle change rate $d\theta/dt$ is not higher than a predetermined level.

8. A power steering apparatus as set forth in claim 1, further comprising:

a steering angle sensor for determining a steering angle θ as the predetermined physical quantity;

wherein the threshold computation circuit includes a steering angle threshold computation circuit for determining a steering angle threshold $\Delta\theta$ as a function of the vehicle speed V sensed by the vehicle speed sensor;

wherein the comparison means includes means for judging whether or not the steering angle θ sensed by the steering angle sensor is within a range defined between left and right threshold values $\pm\Delta\theta$ with respect to a steering angle midpoint;

wherein the control circuit is operative to switch the control mode from the first mode to the second mode on the basis of a necessary condition that the steering angle θ is within the range defined between the left and right threshold values $\pm\Delta\theta$ with respect to the steering angle midpoint.

9. A power steering apparatus as set forth in claim 8, wherein the steering angle threshold computation circuit includes a memory which stores therein values of the steering angle threshold $\Delta\theta$ derived from the function of the vehicle speed.

10. A power steering apparatus as set forth in claim 8, wherein the control circuit is operative to switch the control mode from the first mode to the second mode if the necessary condition is kept satisfied for a predetermined period of time.

* * * * *